(12) United States Patent
Petz

(10) Patent No.: US 10,634,097 B2
(45) Date of Patent: Apr. 28, 2020

(54) COMBUSTION ENGINE WITH FRESH GAS LINE TO INCREASE TURBULENCE

(71) Applicant: Bayerische Motoren Werke Aktiengesellschaft, Munich (DE)

(72) Inventor: Roland Petz, Mainburg (DE)

(73) Assignee: Bayerische Motoren erke Aktiengesellschaft, Munich (DE)

( * ) Notice: Subject to any disclaimer, the term of this patent is extended or adjusted under 35 U.S.C. 154(b) by 611 days.

(21) Appl. No.: 14/920,141

(22) Filed: Oct. 22, 2015

(65) Prior Publication Data

US 2016/0123277 A1    May 5, 2016

(30) Foreign Application Priority Data

Nov. 4, 2014   (DE) .......................... 10 2014 222 446

(51) Int. Cl.
*F02M 23/00* (2006.01)
*F02B 29/04* (2006.01)

(52) U.S. Cl.
CPC ....... *F02M 23/006* (2013.01); *F02B 29/0481* (2013.01); *F02M 23/003* (2013.01); *F02M 2023/008* (2013.01); *Y02T 10/146* (2013.01)

(58) Field of Classification Search
CPC .......... F02B 29/06; F02B 29/02; F02B 29/04; F02B 29/0456; F02B 29/045;
(Continued)

(56) References Cited

U.S. PATENT DOCUMENTS 4,467,760 A * 8/1984 Namba .................. F02B 31/08
                                                                    123/184.45
4,470,391 A    9/1984 Ishida
(Continued)

FOREIGN PATENT DOCUMENTS

CN        2519030 Y    10/2002
CN        2818822 Y     9/2006
(Continued)

OTHER PUBLICATIONS

Chinese-language Office Action issued in counterpart Chinese Application No. 201510733514.2 dated Jul. 24, 2017 with English translation (Eleven (11) pages).
(Continued)

*Primary Examiner* — Carl C Staubach
(74) *Attorney, Agent, or Firm* — Crowell & Moring LLP

(57) ABSTRACT

A combustion engine has at least one cylinder with a gas exchange inlet valve and a gas exchange outlet valve. A fuel injection device injects fuel directly into the cylinder. A fresh air section can be connected intermittently for fresh gas transmission to the cylinder via the gas exchange inlet valve. An exhaust section can be connected intermittently for exhaust gas transmission to the cylinder via the gas exchange outlet valve. A throttle element is provided in the fresh air section ahead of the gas exchange inlet valve in the direction of flow of a fresh air. A fresh gas line is provided, which opens into the fresh air section after the throttle element, in the region of the at least one gas exchange inlet valve. The fresh gas line opens into the fresh air section via a nozzle, which has flow according to Bernoulli, Venturi or Coanda.

6 Claims, 2 Drawing Sheets

(58) Field of Classification Search
CPC .............. F02B 29/0475; F02B 27/0242; F02B 27/0226; F02B 27/0205; F02B 27/005; F02B 27/00; F02B 33/44; F02M 2700/1305
See application file for complete search history.

(56) References Cited

U.S. PATENT DOCUMENTS

| | | | |
|---|---|---|---|
| 4,612,903 A | 9/1986 | Urabe et al. | |
| 4,649,882 A * | 3/1987 | Kawanabe | F02D 35/003 123/682 |
| 5,205,120 A | 4/1993 | Oblaender et al. | |
| 5,819,538 A * | 10/1998 | Lawson, Jr. | F02B 21/00 60/611 |
| 6,247,460 B1 * | 6/2001 | Lindberg | F02B 29/0481 123/559.1 |
| 6,826,910 B1 * | 12/2004 | Easton | F02G 1/00 123/559.1 |
| 7,076,952 B1 * | 7/2006 | Vetrovec | F02B 33/40 123/559.1 |
| 7,198,036 B2 | 4/2007 | White | F02M 31/20 123/542 |
| 7,314,043 B1 * | 1/2008 | Berger | F01L 3/06 123/26 |
| 7,353,812 B1 | 4/2008 | Gosdzinski et al. | |
| 7,762,069 B2 * | 7/2010 | Gerum | B60T 17/02 123/585 |
| 7,877,996 B2 * | 2/2011 | Berger | F01L 3/06 60/598 |
| 8,899,041 B2 * | 12/2014 | Baumgartner | F02B 37/04 123/562 |
| 8,935,024 B2 * | 1/2015 | Shutty | F02B 21/00 60/597 |
| 2005/0279093 A1 * | 12/2005 | Wang | F02B 29/0425 60/599 |
| 2006/0168958 A1 * | 8/2006 | Vetrovec | F02B 33/40 60/599 |
| 2007/0125346 A1 * | 6/2007 | Vetrovec | F02B 33/40 123/563 |
| 2007/0246008 A1 * | 10/2007 | Gerum | B60T 17/02 123/316 |
| 2008/0133110 A1 * | 6/2008 | Vetrovec | F02B 29/0412 701/103 |
| 2011/0036335 A1 | 2/2011 | Wood et al. | |
| 2017/0009715 A1 * | 1/2017 | Cho | F02M 35/10268 |

FOREIGN PATENT DOCUMENTS

| | | |
|---|---|---|
| CN | 2830671 Y | 10/2006 |
| CN | 101994615 A | 3/2011 |
| DE | 35 14 327 A1 | 10/1985 |
| DE | 40 27 963 C1 | 10/1991 |
| DE | 40 41 628 A1 | 7/1992 |
| DE | 196 17 781 A1 | 11/1997 |
| DE | 199 44 946 A1 | 3/2001 |
| DE | 102 24 719 B4 | 3/2007 |
| DE | 10 2011 110 698 A1 | 2/2013 |
| GB | 2 319 298 A | 5/1998 |

OTHER PUBLICATIONS

Chinese-language Office Action issued in counterpart Chinese Application No. 201510733514.2 dated Mar. 16, 2018 with English translation (eleven (11) pages).

* cited by examiner

COMBUSTION ENGINE WITH FRESH GAS LINE TO INCREASE TURBULENCE

CROSS REFERENCE TO RELATED APPLICATION

This application claims priority under 35 U.S.C. § 119 from German Patent Application No. 10 2014 222 446.2, filed Nov. 4, 2014, the entire disclosure of which is herein expressly incorporated by reference.

BACKGROUND AND SUMMARY OF THE INVENTION

The invention relates to a combustion engine having at least one cylinder having at least one gas exchange inlet valve and at least one gas exchange outlet valve, and a fuel injection device for injecting fuel directly into the cylinder.

As regards the technical context, attention is drawn to German Laid-Open Application DE 40 416 28 A1, for example. From this document, a mixture-compressing combustion engine with secondary air injection and with air mass measurement is known. This engine also has an injection valve with sequential fuel injection and air assistance, wherein an air line provided for the air assistance is provided with a shutoff valve that opens in the starting and warm-up phase of the combustion engine. With this combustion engine, the fuel injection takes place in the inlet duct in the cylinder head. With this configuration, mixture preparation is improved in the starting and warm-up phase of the combustion engine so as to reduce toxic exhaust gas components.

A system for compensating the boost pressure in pressure-charged internal combustion engines is furthermore known from German Laid-Open Application DE 199 44 946 A1. This system is used to supply turbocharged internal combustion engines with compressed air in order to improve operating behavior outside the optimum operating range of the turbocharger. The system preferably includes a pressure reservoir, a compressor and a valve. The pressure reservoir is supplied continuously with compressed air. If the boost pressure supplied by the turbocharger is not sufficient, the valve is opened and the compressed air is fed from the reservoir into the cylinder for combustion. The purpose of such a system is especially to charge turbocharged internal combustion engines outside the optimum operating range of the turbocharger.

The disadvantage with this configuration is the very high outlay of the apparatus.

A reciprocating-piston combustion engine having at least two inlet valves and associated inlet ducts per cylinder is furthermore known from German Patent DE 40 27 963 C1, wherein the first inlet duct is connected to an exhaust gas recirculation system and the second inlet duct has a fresh-gas turbulence system. The reciprocating-piston combustion engine is characterized in that the exhaust gas recirculation system and the fresh-gas turbulence system are designed as ducts which open with an equal eccentricity into the respective inlet duct in order to generate a swirling flow in the cylinder.

This configuration is used to achieve the object of further increasing the turbulence which arises in the cylinders of a combustion engine of the type in question.

The disadvantage with this known turbulence system is that the turbulence system does not operate in combination with an exhaust turbocharger system owing to the prevailing pressure conditions.

Another system for increasing the turbulence in the combustion chamber of an internal combustion engine while simultaneously providing turbocharging is known from German Patent DE 102 24 719 B4. This patent discloses a device for feeding cylinders of pressure-charged internal combustion engines having the following structure:

- a charger is arranged ahead of the intake tract of the internal combustion engine,
- a pressure accumulator is connected to the charger with valves controlled by an engine control unit arranged in between in order to fill the intake tract,
- from the intake tract, intake pipes, which are each routed to an intake duct of a cylinder, are connected to the cylinder head,
- a control flow duct that can be opened in a controlled manner issues ahead of an inlet valve of each cylinder, said duct being connected to the pressure accumulator with a first control valve in between, and
- the control valve is controlled electrically in a synchronized manner, directly or indirectly, by the engine control unit during the filling of the respective cylinder.

With this known device for increasing the turbulence in the combustion chamber of an internal combustion engine, the high outlay of the apparatus is also disadvantageous.

Gas-kinetic injection for pressure charging and introducing water in internal combustion engines is furthermore known from German Laid-Open Application DE 196 17 781 A1. In this laid-open application, there is a proposal to accelerate the air column in the intake pipe at the correct point in time with a small quantity of high-pressure gas (10 to 200 bar) in order to fill or to scavenge the combustion chamber.

The disadvantage with this proposal is the still immense expenditure of air required to accelerate the air column in the intake pipe, while effective influence on the increase in the degree of turbulence in the combustion chamber is still not achieved.

It is the object of the present invention to provide as simple a way as possible of increasing the charge movement (degree of turbulence) in a direct-injection Otto-cycle combustion engine in a simple manner.

This and other objects are achieved by a combustion engine having at least one cylinder having at least one gas exchange inlet valve and at least one gas exchange outlet valve, a fuel injection device for injecting fuel directly into the cylinder, a fresh air section, which can be connected intermittently for gas transmission to the cylinder via the gas exchange inlet valve, and an exhaust section, which can be connected intermittently for gas transmission to the cylinder via the gas exchange outlet valve. A throttle element is provided in the fresh air section ahead of the gas exchange inlet valve in the direction of flow of a fresh air. A fresh gas line line is provided, which opens into the fresh air section after the throttle element, in the region of the at least one gas exchange inlet valve. The fresh gas opens into the fresh air section via a nozzle, which has flow according to Bernoulli, Venturi or Coanda.

By means of a separate duct (fresh gas line), taken to a point ahead of the at least one gas exchange inlet valve, and of a nozzle shaped in accordance with the invention at the end (also referred to as a pulse nozzle, having a flow geometry in accordance with Bernoulli, Venturi or Coanda), it is possible to induce a directional fresh gas pulse into the combustion chamber when the inlet valve is open. Depending on the intensity of this pulse, different levels of charge movement can be produced. The intensity of the fresh gas pulse can be controlled or set in a simple manner by way of a compressor or of a pressure reservoir, which is filled with fresh air or from the fresh gas section with a feed point ahead of the throttle element, for example. In addition to the ignition angle, boost pressure, injection quantity and injection time, the further variable "charge movement" is advantageously available as a result for the application of the combustion engine. Another significant power boost for the combustion engine is possible with the arrangement of a vortex tube in the fresh gas line since a significantly higher filling ratio of the at least one cylinder is possible through the cooling of the fresh air delivered.

Bernoulli:

Bernoulli discovered the relationship between the speed of flow of a fluid and its pressure. He discovered that an increase in speed in a flowing fluid (gas or liquid) is accompanied by a drop in pressure.

The use of "Bernoulli flow" is often found, for example:
in a waterjet pump;
in an intake funnel of a carburetor;
in a Prandtl pitot tube, which is used to measure the speed of an aircraft, for example;
in the flow around the wings of aircraft up to speeds of about 300 km/h.

Venturi:

The Italian Venturi discovered that the speed of flow of an incompressible fluid flowing through a tube is inversely proportional to the variation in the tube cross section. That is to say that the speed of the fluid is greatest where the cross section of the tube is smallest.

According to the law of continuity for incompressible fluids, the quantity of fluid emerging from any tube section is the same as that introduced into it. The fluid must therefore pass through the constriction at the same flow rate (quantity/time) as the rest of the tube. Therefore, the speed of the fluid must necessarily increase.

Coanda:

The Coanda effect is a collective term used for various phenomena with unrelated causes, referring to the tendency of a gas jet or a liquid flow to "cling" to a convex surface instead of separating from it and moving onward in the original direction of flow.

An accurate definition and a precise distinction from the Bernoulli effect are difficult.

In 1910, Coanda built an airplane, the Coanda-1910. It was to be driven by a combination of a piston-driven compressor and two combustion chambers. The engine was mounted on the tip of the fuselage and exhausted the two thrust jets obliquely rearward. Coanda realized that the exhaust gases were following the contour of the fuselage and flowing along it (Coanda effect), destroying the aircraft.

There are now technical applications of the Coanda effect, e.g. in aeronautics and Formula 1 (exhaust engineering).

Vortex Tube:

The widely known vortex tube is a device by which gas can be divided into a hot stream and a cold stream.

Air under pressure (fresh gas) is injected tangentially into a vortex chamber, being made to rotate rapidly in the process (over 1,000,000 rpm), and leaves the chamber through two different axial air outlets arranged opposite one another:
cooled air emerges through a small hole;
hot air emerges through a significantly larger hole situated opposite.

The temperature difference between the holes can be up to 46° C., depending on the operating parameters. During this process, there is a whistling sound of about 3 kHz, but this can be attenuated by suitable known measures (although resonators are not suitable for this purpose).

In a preferred aspect of the invention, the fresh air can be injected into the fresh air section at an angle of between +/−60° to a flow axis by way of the nozzle, which leads to a desired positive increase in turbulence. Advantageously, the nozzle may be a separate component and be made of metal or a plastic. The nozzle may be machined directly into a gas exchange inlet duct wall. The fresh gas line can be fed with fresh air by a pressure accumulator or a compressor or a feed point in the fresh air section ahead of the throttle element in the flow direction of the fresh air.

In a further embodiment, a vortex tube is arranged in the fresh gas line. This embodiment enables setting of a cooling ratio of the fresh air in the fresh air section in a simple manner. This leads to a better filling ratio of the cylinders and thus advantageously to an increase in the power of the combustion engine without additional measures.

An Otto-cycle combustion engine having a fresh gas line with a nozzle according to the invention arranged close to the gas exchange inlet valve and operating on the Bernoulli, Venturi or Coanda effect to increase charge movement receives its fresh air mass flow from a pressure accumulator or a compressor, for example. The accumulator or compressor has the task, on the one hand, of ensuring the required air mass to deflect the main air mass flow in the fresh air section ahead of the gas exchange inlet valve and hence to maximize charge movement, it being possible, on the other hand, for this fresh air mass flow to be passed through a vortex tube, which cools the injected air mass by up to 46° C. under ambient conditions, depending on the operating parameters set. This cold fresh air mass cools the main air mass flow in the fresh air section ahead of the gas exchange inlet valve in accordance with the overall configuration (air mass distribution of main air mass flow/fresh air mass flow, ambient temperature, prevailing pressure conditions and vortex tube specifications) and, by means of the cooler combustion air, advantageously ensures higher power from the Otto-cycle combustion engine, in addition to the advantages of better mixture formation (charge movement in the cylinder).

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
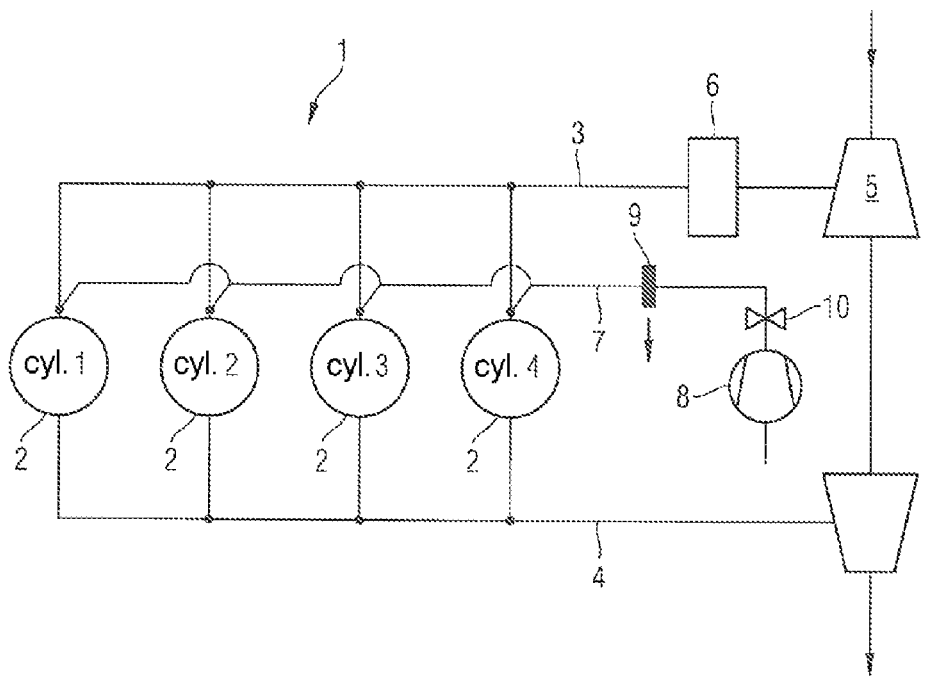
FIG. 1 is a schematic diagram of a structure of an applied-ignition Otto-cycle combustion engine according to an embodiment of the invention.

FIG. 1 shows schematically the structure of an applied-ignition combustion engine 1. In this illustrative embodiment, the engine 1 is pressure-charged. The pressure-charged, applied-ignition combustion engine 1 has at least one cylinder 2, in the illustrative embodiment under consideration four cylinders 2 in series are shown. Each cylinder 2 is assigned at least one gas exchange inlet valve (not shown in FIG. 1) and at least one gas exchange outlet valve (not shown in FIG. 1). The combustion engine 1 furthermore has a fuel injection system (not shown) for injecting fuel directly into the cylinders 2. That is to say, the combustion engine 1 is a direct-injection, mixture-compressing combustion engine 1 with ignition applied by an ignition device (not shown).

Figure 2:
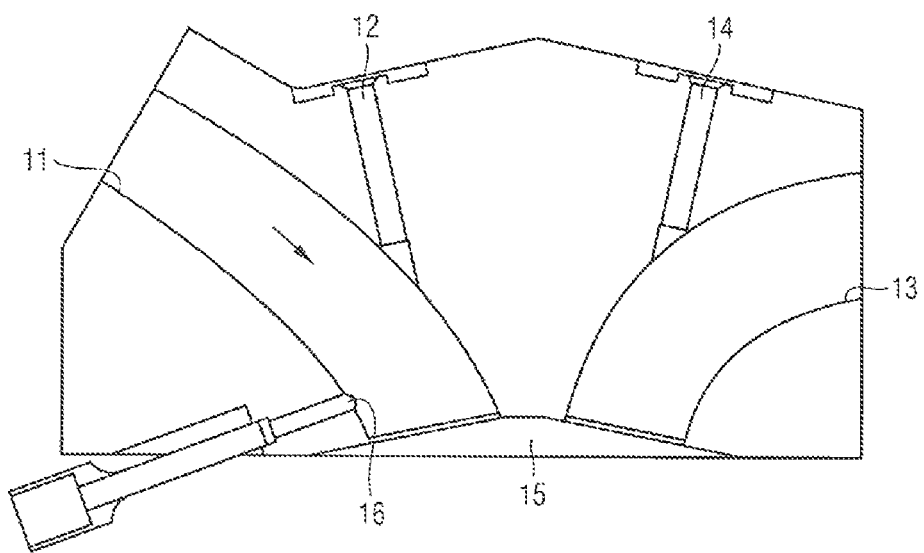
FIG. 2 schematically illustrates an installation position of a nozzle according to an embodiment of the invention.

The combustion engine 1 furthermore has a fresh air section 3, which can be connected intermittently for fresh gas transmission to the cylinder 2 via the gas exchange inlet valve 12 shown in FIG. 2. Moreover, the combustion engine 1 is provided with an exhaust section 4, which can be connected intermittently for exhaust gas transmission from the cylinder 2 via the gas exchange outlet valve 14 (likewise shown in FIG. 2). In this illustrative embodiment, a compressor 5, e.g. a compressor of an exhaust turbocharger, is furthermore arranged in the fresh air section 3, wherein the turbine of the exhaust turbocharger is arranged in the exhaust section 4. Of course, the compressor 5 can also be a mechanical compressor or some other type of compressor.

In another illustrative embodiment, the compressor 5 can also be absent, and then this is a "naturally aspirated" engine, or a combustion engine for naturally aspirated operation.

For load control of the combustion engine 1, a throttle member 6, in the illustrative embodiment under consideration a throttle valve, is provided between the compressor 5 and the cylinders 2. A rotary slide valve can also be used as a throttle member 6, for example.

The compressor 5 and a turbine of the exhaust turbocharger are connected to one another for conjoint rotation. During the operation of the combustion engine 1, the compressor driven by the turbine draws in fresh gas from the environment, indicated by an arrow head on the fresh air section 3. In the fresh air section 3, the compressed fresh air is passed onward through the throttle element 6 until the fresh air is burnt in the cylinders 2 with supplied fuel and is expelled into the exhaust section 4. The exhaust gas then drives the turbine and leaves the exhaust section 4, again indicated schematically by an arrow head.

A fresh gas line 7 is also provided, being supplied with compressed air or fresh air by a compressed air accumulator or a first compressor 8 and opening into the fresh air section 3 after the throttle element 6 in the region of the at least one gas exchange inlet valve 12 via the nozzle 16 according to the invention with a flow contour according to Bernoulli, Venturi or Coanda. A vortex tube 9, in which the fresh air in the fresh gas line 7 is cooled, is furthermore provided in the fresh gas line 7 between the compressed air accumulator or the first compressor 8. In the illustrative embodiment under consideration, a second throttle element 10 is furthermore provided in the fresh gas line 7 between the first compressor 8 and the vortex tube 9, for the purpose of setting the cooling rate of the fresh air flowing through the fresh gas line 7.

The fresh gas line 7 (also referred to as a pulse duct) and the control of charge movement which is thereby possible make other measures for producing charge movement superfluous. The previous disadvantages of unfavorable combustion chamber geometry (knocking) and unfavorable geometry of the flow ducts (poor filling) are eliminated, making the pressure-charged direct-injection Otto-cycle combustion engine more efficient and more powerful in a larger operating range. In addition, the influencing of charge movement provides a further application variable, which has a direct, positive effect on combustion. Moreover, the fresh air delivered via the fresh gas line 7 is cooled by the vortex tube 9, increasing the filling ratio of the cylinders 2 and thus increasing the power of the combustion engine in an advantageous way.

An Otto-cycle combustion engine having a fresh gas line with a nozzle 16 according to the invention arranged close to the gas exchange inlet valve 12 and operating on the Bernoulli, Venturi or Coanda effect to increase charge movement receives its fresh air mass flow from a pressure accumulator or a compressor, for example. The accumulator or compressor has the task, on the one hand, of ensuring the required air mass to deflect the main air mass flow in the fresh air section 3 ahead of the gas exchange inlet valve 12 and hence to maximize charge movement, it being possible, on the other hand, for this fresh air mass flow to be passed through a vortex tube 9, which cools the injected air mass by up to 46° C. under ambient conditions, depending on the operating parameters set. This cold fresh air mass cools the main air mass flow in the fresh air section 3 ahead of the gas exchange inlet valve in accordance with the overall configuration (air mass distribution of main air mass flow/fresh air mass flow, ambient temperature, prevailing pressure conditions and vortex tube specifications) and, by means of the cooler combustion air, advantageously ensures higher power from the Otto-cycle combustion engine 1, in addition to the advantages of better mixture formation (charge movement in the cylinder).

By use of a separate fresh air duct (fresh gas line 7), taken to a point ahead of the at least one gas exchange inlet valve 12, and of a nozzle 16 shaped in accordance with the invention at the end, it is possible to induce a directional fresh gas pulse into the combustion chamber 15 when the gas exchange inlet valve 12 is open. Depending on the intensity of this pulse, different levels of charge movement can be produced. The intensity of the fresh gas pulse can be controlled in a simple manner by way of the first compressor 8 or of a pressure reservoir filled with fresh air. In addition to the ignition angle, boost pressure, injection quantity and injection time, the further variable "charge movement" is advantageously available as a result for the application of the combustion engine 1. Another significant power boost for the combustion engine 1 is possible with the arrangement of the vortex tube 9 in the fresh gas line 7 since a significantly higher filling ratio of the at least one cylinder 2 is possible through the cooling of the fresh air delivered by the first pump 8.

FIG. 2 shows an installation position of the nozzle 16 according to the invention for one illustrative embodiment. A gas exchange inlet duct, which belongs fluidically to the fresh air section 3, is denoted by 11, and a gas exchange outlet duct, which belongs fluidically to the exhaust section 4, is denoted by 13. The associated gas exchange inlet valve is denoted by 12 and the gas exchange outlet valve is denoted by 14. A combustion chamber belonging to the cylinder 2 is denoted by 15. A main flow direction of the fresh air in the gas exchange inlet duct 11 is indicated by an arrow.

The nozzle 16 according to the invention has a flow contour according to Bernoulli, Venturi or Coanda and injects the fresh air into the fresh air section 3 or, as part of the latter, into the gas exchange inlet duct 11 at an angle of between +/−60° to a flow axis of the fresh air (arrow).

The nozzle 16 can be a separate component made of metal or of a plastic or can be machined directly into a gas exchange inlet duct wall, for example.

The fresh gas line 7 is preferably supplied with fresh air by a pressure accumulator or a compressor or a feed point in the fresh air section 3 ahead of the throttle element 6 in the flow direction of the fresh air.

In another preferred embodiment, a vortex tube 9 is arranged in the fresh gas line 7.

LIST OF REFERENCE SIGNS 1. combustion engine
2. cylinder 3. fresh air section
4. exhaust section
5. second compressor
6. throttle element
7. fresh gas line
8. first compressor
9. vortex tube
10. second throttle element
11. gas exchange inlet duct
12. gas exchange inlet valve
13. gas exchange outlet duct
14. gas exchange outlet valve
15. combustion chamber
16. nozzle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A combustion engine, comprising:
   a cylinder having a gas exchange inlet duct, a gas exchange inlet valve associated with the gas exchange inlet duct, a gas exchange outlet duct, and a gas exchange outlet valve associated with the gas exchange outlet duct;
   a fuel injection device that injects fuel directly into the cylinder;
   a fresh air section connectable intermittently for gas transmission by the gas exchange inlet duct to the cylinder via the gas exchange inlet valve;
   an exhaust section connectable intermittently for gas transmission from the cylinder via the gas exchange outlet valve;
   an exhaust turbocharger having a turbine in the exhaust section and a compressor in the fresh air section;
   a first throttle provided in the fresh air section downstream of the compressor but ahead of the gas exchange inlet valve in a flow direction of fresh air;
   a fresh gas line, which is taken to a point in the gas exchange inlet duct ahead of the gas exchange inlet valve;
   a second throttle in the fresh gas line setting a cooling rate of fresh air flowing through the fresh gas line; and
   a nozzle communicating the fresh gas line with the gas exchange inlet duct at said point, the nozzle opening laterally through a wall of the gas exchange inlet duct into the gas exchange inlet duct, said point being closer to the gas exchange inlet valve than the cylinder;
   wherein the nozzle has a flow according to Bernoulli, Venturi, or Coanda; and
   wherein the nozzle is made of metal or plastic.

2. The combustion engine according to claim 1, wherein fresh air injected into the gas exchange inlet duct via the nozzle is injected at an angle of 60° relative to a flow axis.

3. The combustion engine according to claim 1, further comprising:
   a pressure accumulator or a compressor feeding compressed or fresh air to the fresh gas line.

4. The combustion engine according to claim 2, further comprising:
   a pressure accumulator or a compressor feeding compressed or fresh air to the fresh gas line.

5. The combustion engine according to claim 1, further comprising a vortex tube arranged in the fresh gas line receiving compressed fresh air from the second throttle.

6. The combustion engine according to claim 3, further comprising a vortex tube arranged in the fresh gas line receiving compressed fresh air from the second throttle.

* * * * *